(12) United States Patent
Cho

(10) Patent No.: US 11,196,085 B2
(45) Date of Patent: Dec. 7, 2021

(54) NON-AQUEOUS ELECTROLYTIC RECHARGEABLE BATTERIES FOR EXTENDED TEMPERATURE RANGE OPERATION

(71) Applicant: A123 Systems LLC, Waltham, MA (US)

(72) Inventor: Jeong-Ju Cho, Lexington, MA (US)

(73) Assignee: A123 Systems LLC, Waltham, MA (US)

( * ) Notice: Subject to any disclaimer, the term of this patent is extended or adjusted under 35 U.S.C. 154(b) by 0 days.

(21) Appl. No.: 16/276,514

(22) Filed: Feb. 14, 2019

(65) Prior Publication Data

US 2019/0181503 A1 Jun. 13, 2019

Related U.S. Application Data

(60) Division of application No. 14/935,366, filed on Nov. 6, 2015, now Pat. No. 10,270,129, which is a
(Continued)

(51) Int. Cl.
*H01M 10/0525* (2010.01)
*H01M 10/0567* (2010.01)
(Continued)

(52) U.S. Cl.
CPC ....... *H01M 10/0567* (2013.01); *H01M 4/131* (2013.01); *H01M 4/133* (2013.01);
(Continued)

(58) Field of Classification Search
CPC ......... H01M 10/0567; H01M 10/0525; H01M 10/056; H01M 10/0568; H01M 10/0569;
(Continued)

(56) References Cited

U.S. PATENT DOCUMENTS 5,626,981 A 5/1997 Simon et al.
7,223,502 B2 5/2007 Onuki
(Continued)

FOREIGN PATENT DOCUMENTS

JP 2009081048 A 4/2009
JP 2011096643 A 5/2011
(Continued)

OTHER PUBLICATIONS

201510750792,Notification_to_Grant_Pate..._Invention_ (Translated),Sep. 30, 2020 (Year: 2020).*
(Continued)

*Primary Examiner* — Alexander Usyatinsky
(74) *Attorney, Agent, or Firm* — McCoy Russell LLP

(57) ABSTRACT

A rechargeable battery is designed with cells having a specific combination of anode, cathode, and electrolyte compositions to maintain long cycle life at extreme high temperatures and deliver high power at extreme low temperatures. These properties can significantly reduce or altogether eliminate the need for thermal management circuitry, reducing weight and cost. Applications in telecommunications backup, transportation, and military defense are contemplated.

11 Claims, 9 Drawing Sheets

Related U.S. Application Data continuation of application No. 14/536,522, filed on Nov. 7, 2014, now Pat. No. 10,141,605, which is a continuation-in-part of application No. PCT/US2013/045513, filed on Jun. 12, 2013.

(60) Provisional application No. 61/658,704, filed on Jun. 12, 2012, provisional application No. 61/658,712, filed on Jun. 12, 2012.

(51) Int. Cl.

| | | |
|---|---|---|
| H01M 4/58 | (2010.01) | |
| H01M 4/587 | (2010.01) | |
| H01M 10/0568 | (2010.01) | |
| H01M 10/0569 | (2010.01) | |
| H01M 50/10 | (2021.01) | |
| H01M 4/131 | (2010.01) | |
| H01M 4/133 | (2010.01) | |
| H01M 4/134 | (2010.01) | |
| H01M 10/056 | (2010.01) | |
| H01M 4/583 | (2010.01) | |
| H01M 4/36 | (2006.01) | |
| H01M 4/38 | (2006.01) | |
| H01M 4/48 | (2010.01) | |
| H01M 10/42 | (2006.01) | |

(52) U.S. Cl.
CPC ........... *H01M 4/134* (2013.01); *H01M 4/583* (2013.01); *H01M 4/587* (2013.01); *H01M 4/5825* (2013.01); *H01M 10/056* (2013.01); *H01M 10/0525* (2013.01); *H01M 10/0568* (2013.01); *H01M 10/0569* (2013.01); *H01M 50/10* (2021.01); *H01M 4/364* (2013.01); *H01M 4/386* (2013.01); *H01M 4/483* (2013.01); *H01M 2010/4271* (2013.01); *H01M 2300/0028* (2013.01); *H01M 2300/0037* (2013.01)

(58) Field of Classification Search
CPC ........ H01M 2/02; H01M 4/131; H01M 4/133; H01M 4/134; H01M 4/58; H01M 4/583; H01M 4/587; H01M 2/0202; H01M 4/5825; H01M 2010/4271; H01M 2300/0028; H01M 4/386; H01M 4/483; H01M 230/0037; H01M 4/364
See application file for complete search history.

(56) References Cited

U.S. PATENT DOCUMENTS

| | | | |
|---|---|---|---|
| 7,338,734 B2 | 3/2008 | Chiang et al. | |
| 7,348,101 B2 | 3/2008 | Gozdz et al. | |
| 2003/0031923 A1* | 2/2003 | Aoshima | H01M 50/54 429/127 |
| 2004/0002003 A1 | 1/2004 | Kamada et al. | |
| 2005/0233219 A1 | 10/2005 | Gozdz et al. | |
| 2006/0127753 A1* | 6/2006 | Nakashima | H01M 50/411 429/142 |
| 2009/0123813 A1 | 5/2009 | Chiang et al. | |
| 2009/0142663 A1* | 6/2009 | Takeuchi | H01M 10/0567 429/188 |
| 2009/0170006 A1 | 7/2009 | Abe et al. | |
| 2009/0253048 A1* | 10/2009 | Shima | C07C 69/96 429/338 |
| 2009/0325065 A1* | 12/2009 | Fujii | H01M 10/0568 429/199 |
| 2010/0104951 A1* | 4/2010 | Iwama | H01M 4/133 429/337 |
| 2011/0081577 A1 | 4/2011 | Gozdz et al. | |
| 2012/0219854 A1 | 8/2012 | Nakagawa et al. | |
| 2013/0101874 A1 | 4/2013 | Pevear | |
| 2013/0224535 A1 | 8/2013 | Matsuoka et al. | |

FOREIGN PATENT DOCUMENTS

| | | |
|---|---|---|
| WO | 2009113545 A1 | 9/2009 |
| WO | 2011069162 A1 | 6/2011 |

OTHER PUBLICATIONS

Abe, K. et al., "Additives-containing functional electrolytes for suppressing electrolyte decomposition in lithium-ion batteries," Electrochimica Acta, vol. 49, No. 26, Oct. 15, 2004, Available Online Jun. 25, 2004, 10 pages.

ISA United States Patent and Trademark Office, International Search Report Issued in Application No. PCT/US201 3/045513, dated Nov. 29, 2013, WIPO, 3 pages.

Petuibon, R et al., "Comparative study of electrolyte additives using electrochemical impedance spectroscopy on symmetric cells," Journal of Power Sources, vol. 251, No. 1, Apr. 1, 2014, 8 pages.

Klett, M. et al., "Non-uniform aging of cycled commercial LiFePO4//graphite cylindrical cells revealed by postmortem analysis," Journal of Power Sources, vol. 257, Jul. 1, 2014, 38 pages.

Japanese Patent Office, Office Action Issued in Application No. 2015-218698, dated Aug. 27, 2019, 7 pages.

Japanese Patent Office, Office Action Issued in Application No. 2015-218735, dated Sep. 3, 2019, 11 pages.

* cited by examiner

NON-AQUEOUS ELECTROLYTIC RECHARGEABLE BATTERIES FOR EXTENDED TEMPERATURE RANGE OPERATION

CROSS-REFERENCE TO RELATED APPLICATION

The present application is a divisional of U.S. Non-Provisional application Ser. No. 14/935,366 entitled "NON-AQUEOUS ELECTROLYTIC RECHARGEABLE BATTERIES FOR EXTENDED TEMPERATURE RANGE OPERATION" and filed on Nov. 6, 2015. U.S. Non-Provisional application Ser. No. 14/935,366 is a continuation of U.S. Non-Provisional patent application Ser. No. 14/536,522, filed on Nov. 7, 2014, now U.S. Pat. No. 10,141,605. U.S. Non-Provisional patent application Ser. No. 14/536,522 is a continuation-in-part of International Patent Application No. PCT/US2013/045513, filed on Jun. 12, 2013. International Patent Application No. PCT/US2013/045513 claims priority from U.S. Provisional Application Ser. No. 61/658,712 filed on Jun. 12, 2012. International Patent Application No. PCT/US2013/045513 claims further priority to U.S. Provisional Application No. 61/658,704, filed on Jun. 12, 2012. The entire contents of each of the above-listed applications are hereby incorporated by reference for all purposes.

TECHNICAL FIELD

This technology relates generally to non-aqueous electrolytic rechargeable batteries with excellent low-temperature characteristics, long-term stability and high energy density.

BACKGROUND

Rechargeable batteries are typically designed to deliver optimal performance at or close to room temperature. Extreme low or high temperatures can compromise the performance and/or life of the battery. As a result, heating or cooling systems must be integrated to effectively utilize batteries in these operating conditions, which adds complexity and cost. In many cases, this inhibits the deployment of advanced batteries for applications in extreme temperature environments.

SUMMARY

A rechargeable battery is designed with cells having a specific combination of anode, cathode, and electrolyte compositions to maintain long cycle life at extreme high temperatures and deliver high power at extreme low temperatures. These properties can significantly reduce or altogether eliminate the need for thermal management circuitry, reducing weight and cost Applications in telecommunications backup, transportation, and military defense are contemplated.

In one aspect, a rechargeable battery includes a carbon-containing negative electrode capable of intercalating and liberating lithium, a positive electrode comprising a lithium transition metal oxoanion electroactive material, a separator; and a nonaqueous electrolyte solution comprising a lithium salt and at least one organic solvent, wherein the nonaqueous electrolytic solution is free of y-butyrolactone and the organic solvent comprises vinylene carbonate, the at least one additive represented by the formula (1):

$R_1$--A--$R_2$ in which, $R_i$ and $R_2$ independently represent an alkyl group which may be substituted with an aryl group or halogen atom; an aryl group which may be substituted with an alkyl group or halogen atom; or may be taken together to form, together with --A--, a cyclic structure which may contain an unsaturated bond, where "A" is represented by a formula selected from the group consisting of

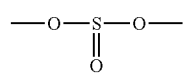  (2)

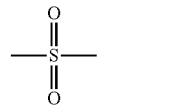  (3)

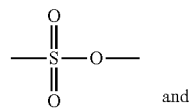 and  (4)

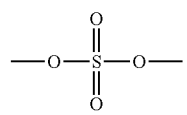  (5)

In one or more embodiments, the electrolytic solution contains 0.1 to 5 weight % of the compound represented by formula (1).

In one or more embodiments, the electrolytic solution contains 1 to 3 weight % of the compound represented by formula (1).

In one or more embodiments, the electrolytic solution contains 1 to 1-5 weight % of the compound represented by formula (1).

In one or more embodiments, the electrolytic solution contains 0.2 to 8 vol % vinylene carbonate.

In one or more embodiments, the electrolytic solution contains 0.5 to 3 vol % vinylene carbonate.

In one or more embodiments, the electrolytic solution contains 0.5 to 2 vol % vinylene carbonate.

In one or more embodiments, the compound represented by formula (1) comprises ethylene sulfite.

In one or more embodiments, the negative electrode comprises carbonaceous materials.

In one or more embodiments, the negative electrode comprises non-graphitizable carbon, artificial graphite and natural graphite combinations of carbonaceous materials with silicon or silicon oxide.

In one or more embodiments, the lithium transition metal oxoanion material is selected from the group consisting of: a composition $Li_x(M'_{i-a}M''_a)_y(XO_4)_z$, $Li_x(M'_{i-a}M''_a)y(OXO_4)_z$, or $Li_x(M'_{1-a} M_1''_a)_y(X_2O_7)_z$, having a conductivity at 27° C. of at least about $10^{-8}$ S/cm, wherein M' is a first-row transition metal, X is at least one of phosphorus, sulfur, arsenic, boron, aluminum, silicon, vanadium, molybdenum and tungsten, M" is one or more Group IIA, IIIA, IVA, VA, VIA, VIIA, VIIIA, IB, IIB, IIIB, IVB, VB, and VIB metal, 0.0001<a<0.1, and x, y, and z are greater than 0 and have values such that x, plus y(1−a) times the formal valence or valences of M' plus ya times the formal valence or valences of M" is equal to z times the formal valence of the $XO_4$, $X_2O_7$ or $OXO_4$ group;

a composition $(Li_{1-a}M''_a)_xM'_y(XO_4)_z$, $(Li_{1-a}M''_a)_xM'_y(OXO_4)_z$, or $(Li_{1-a}M''_a)_xM'_y(X_2O_7)_z$, having a conductivity at 27° C. of at least about $10^{-8}$ S/cm, wherein M is a first-row transition metal, X is at least one of phosphorus, sulfur, arsenic, boron, aluminum, silicon, vanadium, molybdenum and tungsten, M" any of a Group IIA, IIIA, IVA, VA, VIA, VIIA[[, VIIIA, IB, IIB, IIIB, IVB, VB, and VIB metal, $0.0001<a<0.1$, and x, y and z are greater than 0 and have values such that (1−a)x plus the quantity ax time the formal valence or valences of M" plus y times the formal valence or valences of M' is equal to z times the formal valence of the $XO_4$, $X_2O_7$ or $OXO_4$ group; and a composition $(Li_{b-a}M''_a)_xM'_y(XO_4)_z$, $(Li_{b-a}M''_a)_xM'_y(OXO_4)_z$, or $(Li_{b-a}M''_a)_xM'_y(O_2D_7)_z$, having a conductivity at 27° C. of at least about $10^{-8}$ S/cm, wherein M' is a first-row transition metal, X is at least one of phosphorus, sulfur, arsenic, boron, aluminum, silicon, vanadium, molybdenum and tungsten, M" any of a Group IIA, IIIA, IVA, VA, VIA, VIIA, VIIIA, IB, IIB, IIIB, IVB, VB, and VIB metal, D is oxygen, $0.0001<a<0.1$, $a<b<1$, and x, y, and z are greater than 0 and have values such that, (b−a)x plus the quantity ax times the formal valence or valences of M" plus y times the formal valence or valences of M' is equal to z times the formal valence of the $XO_4$, $X_2O_7$ or $OXO_4$ group.

In one or more embodiments, the lithium transition metal oxoanion material is a lithium transition metal phosphate compound having the formula selected from the group consisting of:

(a) $(Li_{1-x}Z_x)MPO_4$, where M is one or more of vanadium, chromium, manganese, iron, cobalt and nickel, Z is one or more of titanium, zirconium, niobium, aluminum, tantalum, tungsten or magnesium, and x ranges from 0 to 0.05; and (b) $Li_{1-x}MPO_4$, wherein M is selected from the group consisting of vanadium, chromium, manganese, iron, cobalt and nickel; and $0 \le x \le 1$.

In one or more embodiments, where said positive electrode has a specific surface area of at least 5 m²/g.

In one or more embodiments, the positive electrode comprises olivinic lithium iron phosphate, optionally containing one or more additional metals.

In one or more embodiments, the battery comprises a solid electrolyte interface (SEI) layer at the anode and the SEI layer comprises a reaction product that is the result of a reaction of the carbon-containing negative electrode and the additive represented by the formula (1).

In one or more embodiments, the area specific impedance at the anode is less than the impedance at an anode in a cell lacking the additive represented by the formula (1).

In one or more embodiments, the molar concentration of the lithium salt is between 0.5 and 2.0 mol/l.

In one or more embodiments, the lithium salt is selected from the group consisting of $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$ and $LiC(CF_3SO_2)_3$.

In one or more embodiments, the electrolytic solution further comprises aprotic solvents.

In one or more embodiments, the solvent comprises at least one of ethylene carbonate, propylene carbonate, butylene carbonate, dimethyl carbonate, diethyl carbonate and ethyl methyl carbonate, γ-valerolactone, methyl acetate, methyl propionate, tetrahydrofuran, 2-methyl tetrahydrofuran, tetrahydropyran, dimethoxyethane, dimethoxymethane, ethylene methyl phosphate, ethyl ethylene phosphate, trimethyl phosphate, triethyl phosphate, halides thereof vinyl ethylene carbonate and fluoroethylenecarbonate, poly (ethylene glycol), diacrylate, and combinations thereof.

In one or more embodiments, the electrolytic solution comprises a mixture of ethylene carbonate, propylene carbonate, ethylmethyl carbonate, and diethyl carbonate.

In one or more embodiments, the battery is contained within a pouch.

In another aspect, a battery system includes a plurality of rechargeable batteries of the preceding embodiments.

In one or more embodiments, the plurality of rechargeable batteries is configured to provide an operating voltage of about 12 volts.

In one or more embodiments, the battery is capable of operating within −30° C. to +70° C. without battery management circuitry.

In one or more embodiments, the battery system includes 4 to 16 cells with cathodes comprising lithium iron phosphate.

In another aspect, a microhybrid battery includes a battery housing; a plurality of rechargeable batteries within the battery housing, wherein the rechargeable battery includes any of the preceding embodiments; and a cut-off switch for making and breaking a conductive path between the plurality of rechargeable batteries and an external contact.

In one or more embodiments, the plurality of rechargeable batteries are configured to provide an operating voltage of about 12 volts.

In one or more embodiments, the battery is capable of operating within −30° C. to +70° C. without battery management circuitry.

In one or more embodiments, the battery capacity decreases less than 10% after 300 charge-discharge cycles at 75° C. with 100% depth of discharge and at least 1C charge rate.

In one or more embodiments, the battery can draw at least 20% more current at −30° C. than a battery comprising rechargeable batteries lacking the additive represented by formula (1).

In another aspect, a nonaqueous electrolyte solution includes a lithium salt; and at least one organic solvent, wherein the nonaqueous electrolytic solution is free of γ-butyrolactone and the organic solvent comprises vinylene carbonate, and at least one additive represented by the formula (1):

$R_1$-A-$R_2$ in which $R_1$ and $R_2$ independently represent an alkyl group which may be substituted with an aryl group or halogen atom; an aryl group which may be substituted with an alkyl group or halogen atom; or may be taken together to form, together with -A-, a cyclic structure which may contain an unsaturated bond, where "A" is represented by a formula selected from the group consisting of

(2)

(3)

(4)

and

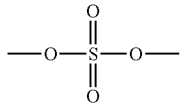

(5)

In one or more embodiments, the electrolytic solution contains 0.1 to 5 weight % of the compound represented by formula (1).

In one or more embodiments, the electrolytic solution contains 0.1 to 3 weight % of the compound represented by formula (1).

In one or more embodiments, the electrolytic solution contains 1 to 1.5 weight % of the compound represented by formula (1).

In one or more embodiments, the electrolytic solution contains 0.2 to 8 vol % of vinylene carbonate.

In one or more embodiments, the electrolytic solution contains 0.5 to 3 vol % of vinylene carbonate.

In one or more embodiments, the electrolytic solution contains 0.5 to 2 vol % of vinylene carbonate.

In one or more embodiments, the compound represented by formula (1) comprises ethylene sulfite.

In one or more embodiments, the electrolytic solution further comprises aprotic solvents.

In one or more embodiments, the solvent comprises at least one of ethylene carbonate, propylene carbonate, butylene carbonate, dimethyl carbonate, diethyl carbonate and ethyl methyl carbonate, γ-valerolactone, methyl acetate, methyl propionate, tetrahydrofuran, 2-methyl tetrahydrofuran, tetrahydropyran, dimethoxyethane, dimethoxymethane, ethylene methyl phosphate, ethyl ethylene phosphate, trimethyl phosphate, triethyl phosphate, halides thereof, vinyl ethylene carbonate and fluoroethylenecarbonate, poly (ethylene glycol), diacrylate, and combinations thereof.

In one or more embodiments, the electrolytic solution comprises a mixture of ethylene carbonate, propylene carbonate, ethylmethyl carbonate, and diethyl carbonate.

These and other aspects and embodiments of the disclosure are illustrated and described below.

BRIEF DESCRIPTION OF THE DRAWINGS

The invention is described with reference to the following figures, which are presented for the purpose of illustration only and are not intended to be limiting. In the Drawings:

(FIG. 8A) and 75° C. (FIG. 8B) of a lithium metal phosphate battery with a modified electrolyte composition and leading competitor batteries.

DETAILED DESCRIPTION

Figure 1:
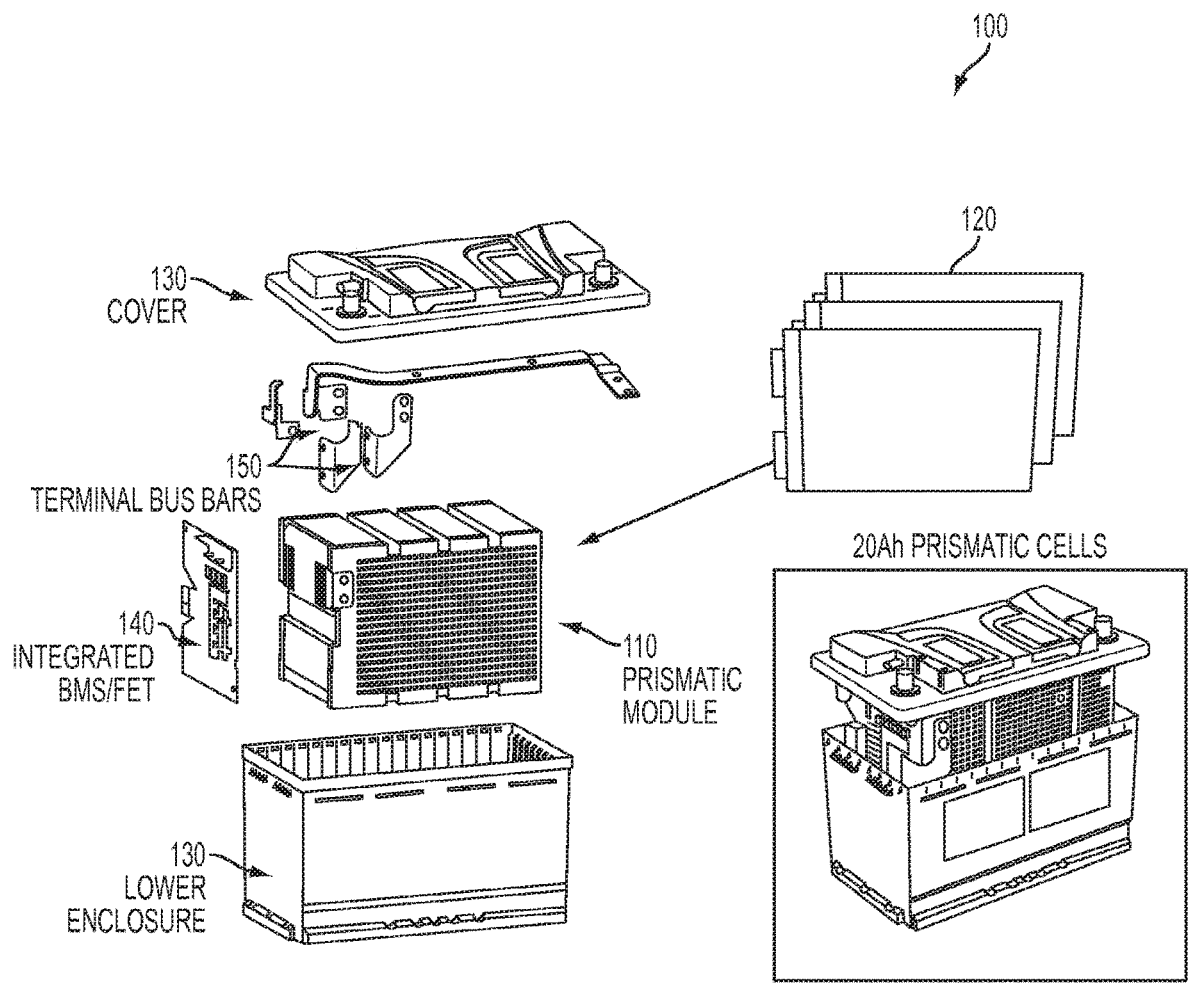
FIG. 1 is a schematic illustration of an exemplary microhybrid battery, according to one or more embodiments. Inset is a photograph of an exemplary battery.

Standard lithium ion technology provides relatively low power at low temperatures. Additionally, designs fix increasing power at low temperature often result in short life at high temperature. As detailed below, this often occurs because modifications of the electrolyte that lower its impedance at low temperatures (0 to −30° C.), for increased power, tends to render the solid electrolyte interface (SEI) to be less stable at high temperatures (room temperature to 75° C.). This has traditionally inhibited their use for applications in extreme temperature environments.

In one embodiment, an electrolyte composition is provided that enhances electrochemical and thermal stability over a wide range of temperatures when used in a lithium ion battery.

The rechargeable batteries containing cells with the anode, cathode, and electrolyte compositions as disclosed herein have been found to maintain long cycle life at extreme high temperatures and deliver high power at extreme low temperatures.

The rechargeable battery contains a negative electrode capable of intercalating and releasing lithium (e.g., a graphitic or silicon/graphite anode), a positive electrode containing a lithium transition metal oxoanion electroactive material, a separator, and a nonaqueous electrolytic solution consisting of a lithium salt and at least one organic solvent, wherein the nonaqueous electrolytic solution is free of γ-butyrolactone and the organic solvent comprises vinylene carbonate and at least one additive represented by the formula (1):

$$R_1\text{--}A\text{--}R_2 \tag{1}$$

in which, $R_1$ and $R_2$ independently represent an alkyl group which may be substituted with an aryl group or halogen atom; an aryl group which may be substituted with an alkyl group or halogen atom: or may be taken together to form, together with --A--, a cyclic structure which may contain an unsaturated bond, where "A" is represented by a formula selected from the group consisting of

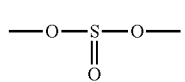

(2)

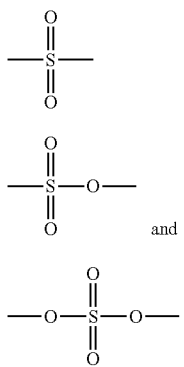

(3), (4), and (5)

R₁ or R₂ can be an alkyl group preferably having 1 to 4 carbon atoms, which are specifically exemplified as a methyl group, ethyl group, propyl group, isopropyl group and butyl group. Examples of an aryl group capable of substituting the alkyl group include phenyl group, naphthyl group and anthranyl group, among these phenyl group being more preferable. Preferable examples of a halogen atom capable of substituting the alkyl group include fluorine atom, chlorine atom and bromine atom. A plurality of these substituents may substitute the alkyl group, and a concomitant substitution by an aryl group and halogen group is also allowable.

The cyclic structure formed by $R_1$ and $R_2$ bound with each other and together with --A--_is of four-membered or larger ring, and may contain a double bond or triple bond. Examples of bound group formed by $R_1$ and $R_2$ bound with each other include —$CH_2$—, —$CH_2CH_2$—, —$CH_2CH_2CH_2$—, —$CH_2CH_2CH_2CH_2$—, —$CH_2CH_2CH_2CH_2CH_2$—, —CH=CH—, —CH=CHCH_2—, —CH=CHCH_2—, $CH_2CH$=$CHCH_2$—and —$CH_2CH_2$C≡$CCH_2CH_2$—. One or more hydrogen atoms in these groups may be substituted by alkyl group(s), halogen atom(s) aryl group(s) and so forth.

Specific examples of the compound having "A" as represented by the formula (2) include linear sulfites such as dimethyl sulfite, diethyl sulfite, ethyl methyl sulfite, methyl propyl sulfite, ethyl propyl sulfite, diphenyl sulfite, methyl phenyl sulfite, ethyl sulfite, dibenzyl sulfite, benzyl methyl sulfite and benzyl ethyl sulfite; cyclic sulfites such as ethylene sulfite, propylene sulfite, butylene sulfite, vinylene sulfite, phenylethylene sulfite, 1-methyl-2-phenylethylene sulfite and 1-ethyl-2-phenylethylene sulfite; and halides of such linear and cyclic sulfites.

Specific examples of the compound having "A" as represented by the formula (2) include linear sulfites such as dimethyl sulfite, diethyl sulfite, ethyl methyl sulfite, methyl propyl sulfite, ethyl propyl sulfite, diphenyl sulfite, methyl phenyl sulfite, ethyl sulfite, dibenzyl sulfite, benzyl methyl sulfite and benzyl ethyl sulfite; cyclic sulfites such as ethylene sulfite, propylene sulfite, butylene sulfite, vinylene sulfite, phenylethylene sulfite, 1-methyl-2-phenylethylene sulfite and 1-ethyl-2-phenylethylene sulfite; and halides of such linear and cyclic sulfites.

Specific examples of the compound having "A" as represented by the formula (3) include linear sulfones such as dimethyl sulfone, diethyl sulfone, ethyl methyl sulfone, methyl propyl sulfone, ethyl propyl sulfone, diphenyl sulfone, methyl phenyl sulfone, ethyl phenyl sulfone, dibenzyl sulfone, benzyl methyl sulfone and benzyl ethyl sulfone; cyclic sulfones such as sulfolane, 2-methyl sulfolane, 3-methyl sulfolane, 2-ethyl sulfolane, 3-ethyl sulfolane, 2,4-dimethyl sulfolane, sulfolane, 3-methyl sulfolane, 2-phenyl sulfolane and 3-phenyl sulfolane; and halides of such linear and cyclic sulfones.

Specific examples of the compound having "A" as represented by the formula (4) include linear sulfonic acid esters such as methyl methanesulfonate, ethyl methanesulfonate, propyl methanesulfonate, methyl ethanesulfonate, ethyl ethanesulfonate, propyl ethanesulfonate, methyl benzenesulfonate, ethyl benzenesulfonate, propyl benzenesulfonate, phenyl methanesulfonate, phenyl ethanesulfonate, phenyl propanesulfonate, methyl benzylsulfonate, ethyl benzylsulfonate, propyl benzylsulfonate, benzyl methanesulfonate, benzyl ethanesulfonate and benzyl propanesulfonate; cyclic sulfonic acid esters such as 1,3-propanesultone, 1,4-butanesultone, 3-phenyl-1,3-propanesultone and 4-phenyl-1,4-butanesultone; and halides of such linear and cyclic sulfonic acid esters.

Specific examples of the compound having "A" as represented by the formula (5) include chain sulfuric acid esters such as dimethyl sulfate, diethyl sulfate, ethyl methyl sulfate, methyl propyl sulfate, ethyl propyl sulfate, methyl phenyl sulfate, ethyl phenyl sulfate, phenyl propyl sulfate, benzyl methyl sulfate and benzyl ethyl sulfate; cyclic sulfuric acid esters such as ethylene glycol sulfuric ester, 1,2-propanediol sulfuric ester, 1,3-propanediol sulfuric ester, 1,2-butanediol sulfuric ester, 1,3-butanediol sulfuric ester, 2,3-butanediol sulfuric ester, phenylethylene glycol sulfuric ester, methylphenylethylene glycol sulfuric ester and ethylphenylethylene glycol sulfuric ester; and halides of such chain and cyclic sulfuric acid esters.

The compound represented by the formula (1) maybe used singly, or two or more of such compounds may be used in combination in the electrolyte composition.

Compounds represented by the formula (1) are exemplified as ethylene sulfite, dimethyl sulfite, sulfolane, sulfolene and 1,3-propane sultone.

The amount of the compound represented by the formula (1) contained in the organic solvent of the nonaqueous electrolyte solution is preferably within a range of 0.05 to 100 vol %, 0.05 to 60 vol %, 0.1 to 15 vol %, or 0.5 to 2 vol %. Alternatively, the additive is with a range of 0.1 to 5 wt %, 1-3 wt %, or 1-1.5 wt %. Some of the compounds represented by the formula (1) are solid in the room temperature, such compounds preferably being used at an amount equal to or lower than the saturation solubility for the organic solvent used, and more preferably at 60 wt % of the saturation solubility or lower, and still more preferably at 30 wt % or lower. Thus, the additive remains dissolved and in solution in the organic solvent over an anticipated use temperature range, such as e.g., between −30° C. and +70° C.

Content of vinylene carbonate in the mixed solvent for the nonaqueous electrolytic solution is preferably from 0.2 to 8 vol %, or from 0.5 to 3 vol %, or 0.5 to 2 vol %.

Compounds represented by the formula (1) are exemplified as ethylene sulfite, dimethyl sulfite, sulfolane, sulfolene and 1,3-propane sultone.

In some embodiments, the cathode active material is a lithium transition metal phosphate compound having the formula $(Li_{1-x}Z_x)MPO_4$, where M is one or more of vanadium, chromium, manganese, iron, cobalt and nickel, Z is one or more of titanium, zirconium, niobium, aluminum, tantalum, tungsten or magnesium, and x ranges from 0 to 0.05 or $Li_{1-x}MPO_4$ wherein M is selected from the group consisting of vanadium, chromium, manganese, iron, cobalt and nickel; and $0 \leq x \leq 1$.

In certain embodiments, the cathode active material is a lithium metal phosphate, for example lithium iron phosphate.

In some embodiments the positive active material consists of powder or particulates with a specific surface area of greater than 5 $m^2/g$, 10 $m^2/g$, or greater than 15 $m^2/g$, or greater than 20 $m^2/g$, or even greater than 30 $m^2/g$.

$LiFePO_4$, having the olivine structure and made in the form of very small, high specific surface area particles are exceptionally stable in their delithiated form even at elevated temperatures and in the presence oxidizable organic solvents, e.g., electrolytes, thus enabling a safer Li-ion battery having a very high charge and discharge rate capability. In addition, the small-particle-size, high specific-surface-area $LiFePO_4$ material exhibits not only high thermal stability, low reactivity and high charge and discharge rate capability, but it also exhibits excellent retention of its lithium intercalation and deintercalation capacity during many hundreds, or even thousands, of high-rate cycles.

The transition-metal doped $LiFePO_4$ has a markedly smaller particle size and much larger specific surface area than previously known positive active materials, such as $LiCoO_2$, $LiNiO_2$ or $LiMn_2O_4$ and, thus improved transport properties. While methods are known to produce these traditional positive active materials in the form of high specific surface area powders, Li-ion battery batteries made from such materials have inferior safety and stability characteristics due to a combination of the high oxidation potential and low inherent thermal stability of these conventional materials in their partially or fully delithiated form, such as that existing in a partially or fully charged Li-ion battery.

Materials for the anode can include, carbonaceous materials capable of occluding and liberating lithium such as decomposition products obtained by thermal decomposition of organic substances under a variety of conditions, hard (non-graphitizable) carbon, artificial graphite and natural graphite. Alternately, the materials for composing the negative electrode can include combinations of these carbonaceous materials in combination with silicon or silicon oxide. These materials may be used singly or in combination of two or more.

When the graphitic carbonaceous materials are used, it is preferable to use an artificial graphite made from soft (graphitizable) pitch of various origins processed by high temperature annealing; purified natural graphite; or these graphites subjected to a variety of surface processings with, for example, pitch.

There is no restriction on the method of fabricating the negative or positive electrode using the aforementioned active materials. For example, the electroactive material is mixed, as required, with a binder, conductive material, solvent, etc. to prepare a slurry, and the slurry is then coated on a substrate of a current collector, which is followed by drying to produce the electrode. Also, such electrode materials may be subjected to roll forming or compression molding to be fabricated into a sheet or pellet, respectively.

Types of the binder used for the fabrication of the electrode is not particularly limited as far as it is stable to the solvent and electrolytic solution used in the fabrication of the electrode. Examples of the binder include resinous polymers such as polyethylene, polypropylene, polyethylene terephthalate, aromatic polyamide, and cellulose; rubbery polymers such as styrene-butadiene rubber, isoprene rubber, butadiene rubber, and ethylene-propylene rubber; thermoplastic elastomeric polymers such as styrene-butadiene-styrene block copolymer and its hydrogenated product, styrene-ethylene-butadiene-styrene block copolymer and its hydrogenated product, and styrene-isoprene-styrene block copolymer and its hydrogenated product; flexible resinous polymers such as syndiotactic 1,2-polybutadiene, ethylene-vinyl acetate copolymer, and propylene-a,-olefin (having 2 to 12 carbon atoms) copolymer; and fluorocarbon polymers such as polyvinylidene fluoride, polytetrafluoroethylene, and polytetrafluoroethylene-ethylene copolymer.

As the binder, one can also use a polymer composition having alkali metal ion (lithium ion, in particular) conductivity. As such ion conductive polymer compositions, these may be used a composite system made of polymeric compound as combined with lithium salt or with an alkali metal salt.

The negative electrode material and the binder may be mixed in various manners. For example, particles of both of them are mixed, or particles of the negative electrode material are entangled with fibrous binder to form a mixture, or a layer of the binder is deposited on the surface of the particles. Mixing ratio of the binder to the particle of the negative electrode material is preferably 0.1 to 30 wt % of the negative electrode material, and more preferably 0.5 to 10 wt %. Addition of the binder at an amount exceeding 30 wt % tends to raise the internal resistance of the electrode, and less than 0.1 wt %, on the other hand, tends to weaken the adhesive strength between the current collector and negative electrode material In mixing the negative electrode material and the binder, a conductive material may be mixed jointly. Since the conductive material used is not restricted in type, it may be a metal or a nonmetal. Examples of a metallic conductive material are those composed of metallic elements such as Cu or Ni. Examples of a nonmetallic conductive material are carbon materials such as graphite, carbon black, acetylene black, and Ketjen black. The mean particle diameter of the conductive material is preferably 1 µm or less.

Mixing ratio of the conductive material is preferably 0.1 to 30 wt % of the negative electrode material, and more preferably 0.5 to 15 wt %. By setting the mixing ratio of the conductive material at 30 wt % or less, the charge and discharge capacity of the electrode per unit volume can be made relatively high. When the mixing ratio of the conductive material is set at 0.1 wt % or more, a conduction path between the conductive materials can sufficiently be formed within the electrode.

The above-mentioned mixture containing at least the negative electrode material and the binder is applied onto the current collector foil. The application of the mixture to the current collector can be performed by means known to those skilled in the art. When the mixture is a slurry, it can be applied onto the current collector by means of a die coater or a doctor blade. The mixture in a pasty form can be applied onto the current collector by roller coating or the like. The mixture containing a solvent is dried to remove the solvent, whereby an electrode can be prepared.

The positive electrode containing the positive electroactive material has a specific surface area of the electrode measured using the nitrogen adsorption Brunauer-Emmett-Teller (BET) method after the densification or calendaring step that is greater than 5 $m^2/g$. A positive electrode can have a thickness of less than 125 µm, e.g., between about 50 µm to 125 µm, or between about 80 µm to 100 µm on each side of the current collector, and a pore volume fraction between about 40 and 70 vol. %. The active material is typically loaded at about 10-20 $mg/cm^2$, and typically about 11-15 $mg/cm^2$.

The negative active material consists of powder or particulates with a specific surface area measured using the nitrogen adsorption Brunauer-Emmett-Teller (BET) method to be greater than about 2 m$^2$/g, or 4 m$^2$/g, or even about 6 m$^2$/g. The negative electrode can have a thickness of less than 75 μm, e.g., between about 20 μm to 65 μm, or between about 40 μm to 55 μm on both sides of the current collector, and a pore volume fraction between about 20 and 40 vol. %. The active material is typically loaded at about 5-20 mg/cm$^2$, or about 4-5 mg/cm$^2$.

There is no particular restriction on the fabrication process of the positive electrode, and a similar method for negative electrode described above may be employed.

There is no specific limitation on the source material or morphology of the separator used for the cell of the present invention. The separator serves to separate the negative electrode and the positive electrode so as to avoid their physical contact. The preferred separator has high ion permeability and a low electrical resistance. Materials for the separator are preferably selected from those excellent in stability against the electrolytic solution and in liquid holding properties. For example, nonwoven fabric or porous film made of polyolefins, such as polyethylene and polypropylene, are used as the separator, into which the electrolytic solution is impregnated.

Methods for fabricating the nonaqueous electrolytic solution cell using such nonaqueous electrolytic solution, negative electrode, positive electrode, outer container and separator, is of no specific limitation, and can properly be selected from those being generally employed. The nonaqueous electrolytic solution cell of the present invention may include, if necessary, a gasket, a sealing plate and a cell case besides such nonaqueous electrolytic solution, negative electrode, positive electrode, outer can or pouch material and separator.

In some embodiments, improvement with low temperature applications is observed using the pouch instead of the can container.

The battery as described herein demonstrates advantageous properties over an extreme of temperatures in which a battery can be expected to operate. For example the battery is capable of operation between −30° C. and +70° C. Lowered impedance of the battery is important in both increasing performance at lower temperatures and lengthening battery life. This can be achieved via a combination of design parameters, e.g. selection of specific organic solvents in the electrolyte, increasing electrode surface area and pore volume, as well as the use of advantageous battery containers.

In general, a thicker electrode layer (and higher active material loading) provides greater total capacity for the battery. However, thicker layers also increase the electrode impedance. Contrary to conventional practice and in accordance to one or more embodiments, high capacity, thick layers may be used in a low impedance (high rate) cell. Use of a high specific surface area active material, while maintaining adequate pore volume, provides the desired capacity without increasing impedance to unacceptably high levels. For more information, see U.S. application Ser. No. 11/052,971, incorporated herein by reference.

In terms of battery containers, improvement with low temperature applications is observed using the pouch instead of the can container. When cold cranking a battery, for example to start an engine, one wants to draw a large current. As lithium cells are more resistive at cold temperatures, the high current generates heat in the battery. As the cell heats up, the viscosity of the electrolyte decreases, and the resulting lower battery impedance allows for even greater drawing of current. This process is called "self-heating." As self-heating is important for enhanced low temperature performance, improved results were observed for batteries that use pouch cell containers as opposed to cylindrical (can) cells. This is due to the improved packing density and increased heat insulation of pouch-based batteries. Can-type cells require lower impedance at low temperatures to compensate for the decreased efficiency of self-heating.

Selection of organic solvents in the electrolyte is also important in reducing impedance. In some embodiments, the electrolyte is advantageously free of γ-butyrolactone. It is known in the art that γ-butyrolactone can undergo reductive oxidation on the negative electrode when the battery is charging (see, e.g., Petibon et al., Journal of the Electrochemical Society, 160(1) A117-A124(2013)). The resulting decomposition products cause clogging of the separator. This increases the surface resistance of the negative electrode, e.g. increases impedance at the anode, leading to significant capacity loss with cycling.

Additionally, the use of the additive as represented by formula (1) in addition to vinylene carbonate (VC) in organic electrolytes leads to stable, lower impedance lithium ion batteries. Without being bound by any specific theory, it appears that the additive lowers impedance by reacting with the anode to create a solid electrolyte interface (SEI) that is more ionically conductive than with an electrolyte without the additive. In addition, VC is efficient at passivation of the carbon-based anode during initial charging. VC prevents the additive from decomposing by making the SEI less soluble.

The SEI originates from the thermodynamic instability of graphite-based anodes in an organic electrolytes. The first time a battery is charged ("formation"), the graphite reacts with the electrolyte. This forms a porous passivating layer (called a solid electrolyte interphase, or SEI) that actually protects the anode from further attacks, moderating the charge rate and restricting current. This reaction also consumes little lithium. At high temperatures or when the battery runs all the way down to zero charge ("deep cycling"), the SEI can partially dissolve into the electrolyte. (At high temperatures, electrolytes also tend to decompose and side reactions accelerate, potentially leading to thermal runaway.) When temperatures become lower, another protective layer will form, but this will consume more lithium, leading to higher capacity losses. Thus, stability of the SEI at high temperatures, one benefit of the battery described herein, is important in increasing the life of the battery.

However, if the SEI layer thickens too much, it actually becomes a barrier to the lithium ions, increasing impedance. That affects power performance which is important for electric vehicles.

One way to define cell impedance is to measure area specific impedance. Impedance values can be determined for the total cell or for specific junctions, such as the anode or the cathode. Area specific impedance (ASI) is the impedance of a device normalized with respect to surface area and is defined as the impedance measured at 1 kHz (Ω), using an LCZ meter or frequency response analyzer, multiplied by the surface area of opposing electrodes (cm$^2$). This measurement is typically performed by applying a small (e.g., 5 mV) sinusoidal voltage to the cell and measuring the resulting current response. The resulting response can be described by in-phase and out-of-phase components. The in-phase (real or resistive) component of the impedance at 1 kHz is then multiplied by the surface area of opposing electrodes (cm$^2$) to give the area specific impedance. Area specific impedance can be used to determine the impedance at the anode or at the cathode.

In one aspect, the rechargeable battery is used in a battery system that operates as a microhybrid battery. Micro-hybrid batteries (or vehicles with start-stop feature) enable the vehicle's internal combustion engine to stop running when the vehicle is stationary, such as at a traffic light, saving fuel by up to 10% above conventional vehicles. When the driver releases the brake to press the gas pedal, the engine quickly starts again before the vehicle moves forward. While the development of early generation micro-hybrids focused on smooth engine restarts, next generation systems are looking to recover braking energy as a path to even greater fuel economy. Existing lead acid micro-hybrid battery technology introduces some design constraints because it can't be charged very quickly and most of the vehicle's braking energy is still lost. Batteries with lithium-ion chemistries have a much higher rate of charge acceptance and therefore are positioned to support next generation micro-hybrid systems with higher rates of fuel economy improvement.

Microhybrid batteries can be used as starter batteries for car engines. Their proximity to the engine and location under the hood often does not allow space for bulky thermal management circuitry. Thus, the battery needs to be able to start the engine at cold, ambient temperatures, down to −30° C., without heat input. Additionally, the battery needs to be able to work for extended periods of time under the temperatures of a working car engine (up to 75° C.) without external cooling. Traditional lithium ion batteries suffer from high impedance at low temperatures, which reduces their ability to start an engine. Additionally, designs for increasing power at low temperature in lithium ion batteries often result in short life at high temperature. Although lead acid batteries have improved cold cranking capabilities, they suffer from short lifespans as opposed to lithium ion batteries for start-stop applications.

The nonaqueous electrolytic solution cell of the present disclosure is excellent in low temperature characteristics and long-term stability, and further in cycle characteristics when used in a microhybrid battery system. This technology enhances the success of lithium ion batteries in microhybrids, especially as starter batteries, because it boosts the cold power of the battery allowing it to start the vehicle's engine even in worst case cold temperatures. Additionally, the extended life of the battery at high temperature environments is significant because a common package location for starter batteries is the engine compartment where temperatures are usually higher than ambient during vehicle operation.

FIG. 1 shows a lithium-ion 12V microhybrid engine start battery 100, according to one embodiment. It is made up of a prismatic battery module 110 with sixteen 20Ah cells 120 with modified electrolyte composition in a 4s4p configuration for 80Ah of total capacity (1.06 kWh). The battery module is housed in standard automotive starter battery enclosure 130 (EN50342-2, LN4) with outer dimensions of 175×190 x 315 mm. The unit includes an onboard battery management system with MOSFETs 140 to control the connection to the vehicle system. The management system includes a cut-off switch comprising a plurality of MOSFETs for making and breaking a conductive path between the plurality of rechargeable batteries and an external contact. The management system also includes a microprocessor which is configured through firmware to perform functions such as providing input protection and control of charging, enable/disable circuitry to decrease current consumption, and sense individual battery cell temperature and voltage. The battery communicates via LIN bus protocol 150 with an operating voltage of 9 to 14.4V to support a standard 12V vehicle powernet. FIG. 1 inset shows a photograph of the battery. In some embodiments, the microhybrid battery has reduced thermal management circuitry. Further detail is provided in U.S. application Ser. No. 13/513,665, incorporated herein by reference.

The present invention will be explained in more detail with reference to the following examples. Materials, amounts of uses, ratios, operations and so forth described hereinafter are properly be altered without departing from the spirit of the present invention. The scope of the present invention, therefore, is not limited to specific examples described below. The invention is applicable to any form of battery, e.g. prismatic, button-cell, can, etc.

Example 1: Control Electrolyte Formulation

The control electrolyte formulation consisted of 1M $LiPF_6$ in EC:PC:EMC:DEC=35:5:50:10 v/v %+VC 2 wt %. "EC" denotes ethylene carbonate; "PC" denotes propylene carbonate; "EMC" denotes ethylmethyl carbonate; "DEC" denotes diethyl carbonate; and "VC" denotes vinylene carbonate.

Example 2: ES Only Electrolyte Formulation

This electrolyte formulation consisted of 1M $LiPF_6$ in EC:PC:EMC:DEC=35:5:50:10 v/v %+ES 1 wt %. Here, "ES" denotes ethylene sulfite. The addition of ES lowers impedance by reacting with the anode to create a solid electrolyte interface (SEI) that is more ionically conductive than with the control electrolyte above. However, a battery with this electrolyte (with ES additive only) cannot be charged during formation because the SEI is unstable and generates a lot of gas during decomposition.

Figure 2:
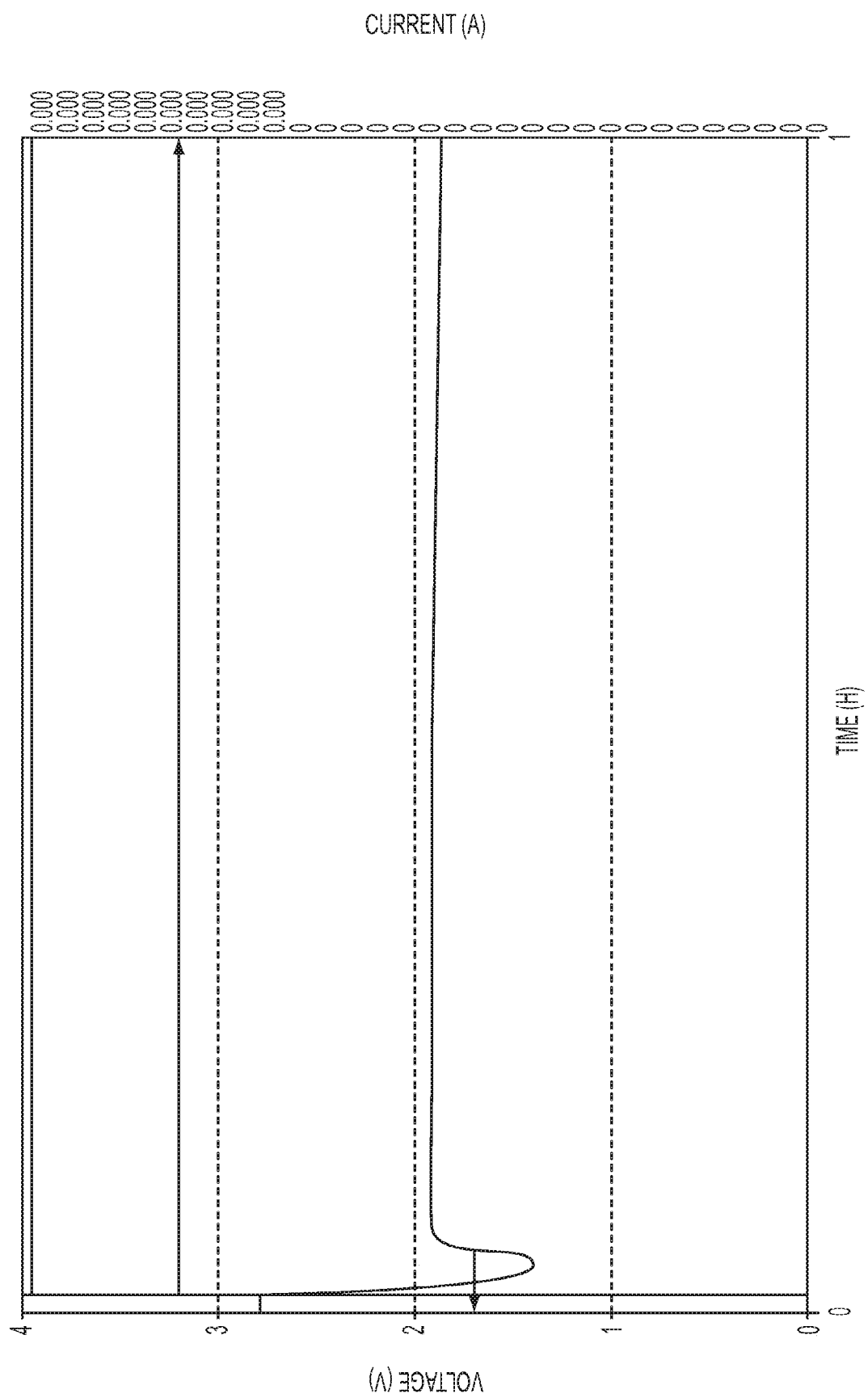
FIG. 2 is a plot of an anode half-cell's formation curve with only ES additive in the electrolyte, according to one or more embodiments.

This effect is shown in FIG. 2 where a carbon-based anode versus lithium half-cell is charged for the first time ("formation" of the SEI curve). A slurry composed of 92 wt. % artificial graphite, 4 wt. % conductive carbon additive and 4 wt. % poly(vinylidene fluoride) (PVDF) binder in N-methylpyrrolidinone (NMP) was coated on a 10 µm thick copper foil, dried in the oven and calendered to form the anode.

The dip in voltage seen in FIG. 2 signifies the formation of the electrolyte. However, the voltage after the dip does not reach 0V (which would be the case if the graphite was fully lithiated), indicating a continuous decomposition of the electrolyte and lack of effective SEI formation. (see, e.g., Abe et al., *Electrochimia Acta* 49(26), 4613-4622 (2004)).

Example 3: Modified Electrolyte Formulation (ES+VC)

Figure 3:
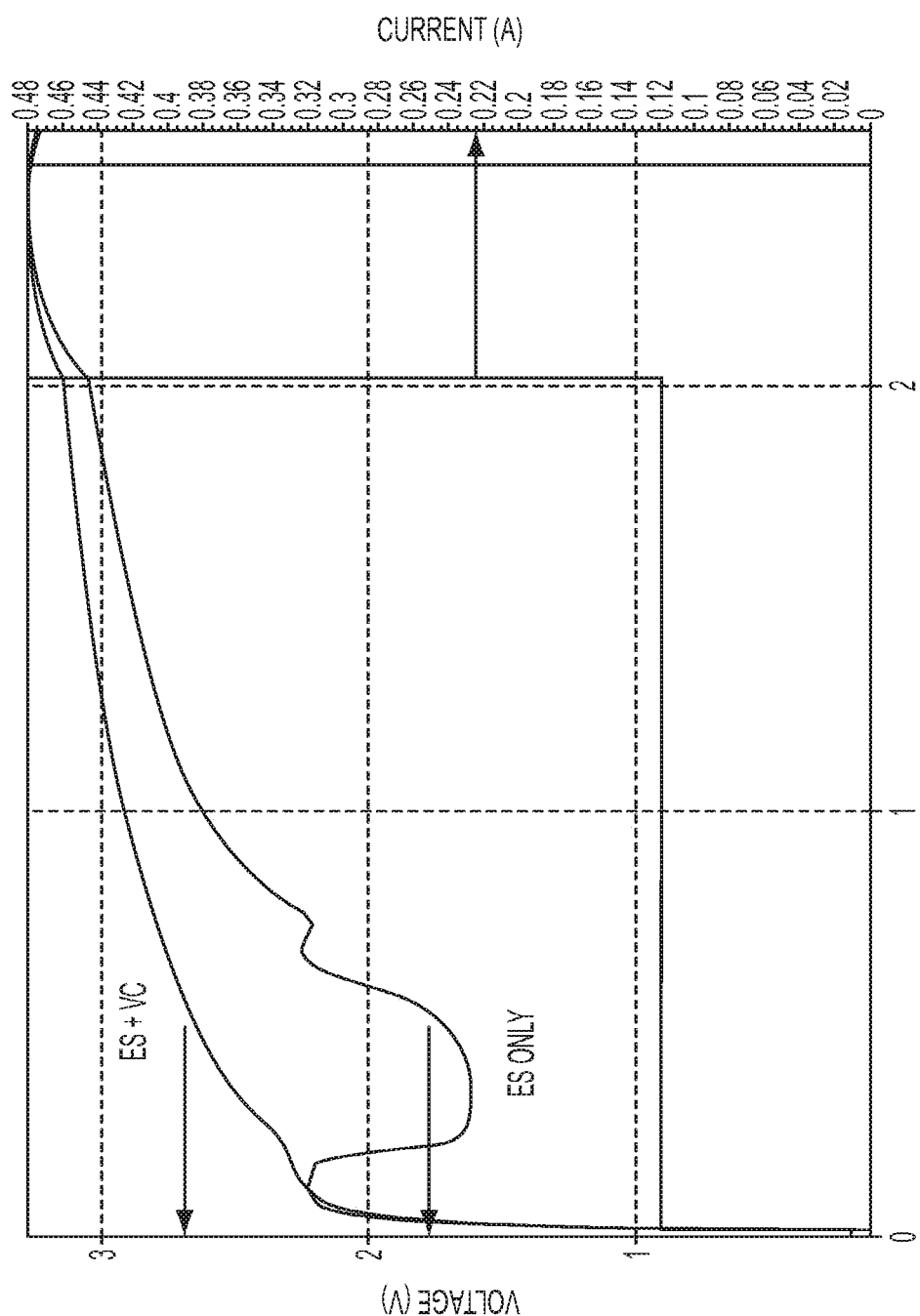
FIG. 3 is a plot of the formation curves for a single use of two secondary cells, one with only ES additive in the electrolyte, and one with ES and VC, according to one or more embodiments.

This "modified" electrolyte formulation consisted of 1 M $LiPF_6$ in EC:PC:EMC:DEC=35:5:50:10 v/v %+VC 2 wt %+ES 1 wt %. FIG. 3 shows a plot of the formation curves of secondary cells with electrolyte compositions from Example 2 ("ES only") and Example 3 ("ES+VC", "modified"). The applied current steps are shown as well. Both cells use the anode of Example 2. A slurry composed of 92 wt. % $LiFePO_4$, 4 wt. % conductive carbon additive and 4 wt. % poly(vinylidene fluoride) (PVDF) binder in N-methylpyrrolidinone (NMP) was coated on a 20 µm thick aluminum foil, dried in the oven and calendered to form the cathodes for both cells. Prismatic cells using the cathode, anode, and a polyolefin microporous separator were assembled with the electrolyte as known in the art.

As seen in FIG. 3, the addition of VC along with ES lowers battery impedance and aids in the formation of a stable SEI layer. The voltage dips seen in curve for "ES only" are characteristic of electrolyte decomposition and gassing. The monotonic voltage increase of the "ES+VC" curve indicates the formation of a stable SEI layer.

The use of ES as co-additive in addition to VC in organic electrolytes enables the proper formation of the SEI in a lithium ion battery and leads to lower impedance batteries.

Example 4: Low Temperature Behavior

The behavior of a secondary cell with and without ("control") the modified electrolyte was compared to absorbent glass mat (AGM) lead acid battery at low temperatures. The modified electrolyte cell is described in Example 3 (ES+VC). The "control" cell is the same as that of the modified cell, except the electrolyte composition does not contain ES or VC.

Figure 4A:
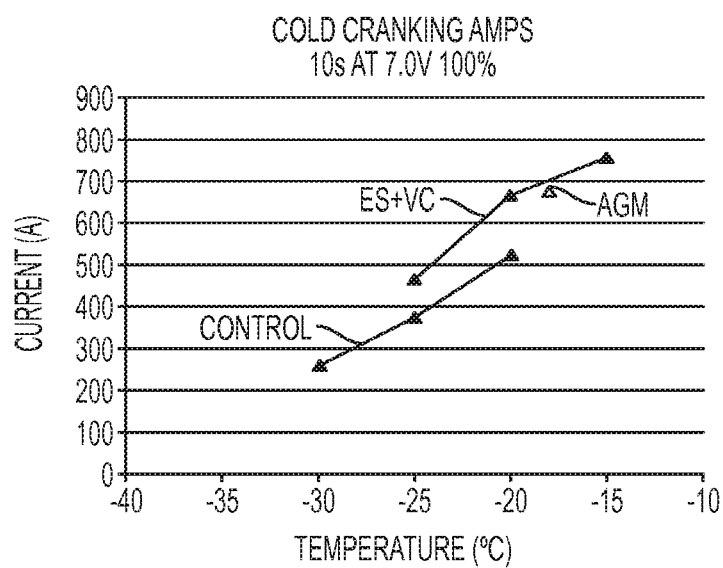
FIGS. 4A-4B are two plots of the cold cranking current capability of three different 60 Ah (FIG. 4A) and 80 Ah (FIG. 4B) capacity batteries: a lead add AGM battery, a control lithium metal phosphate battery, and a lithium metal phosphate battery with a modified electrolyte composition, according to one or more embodiments.
Figure 4B:
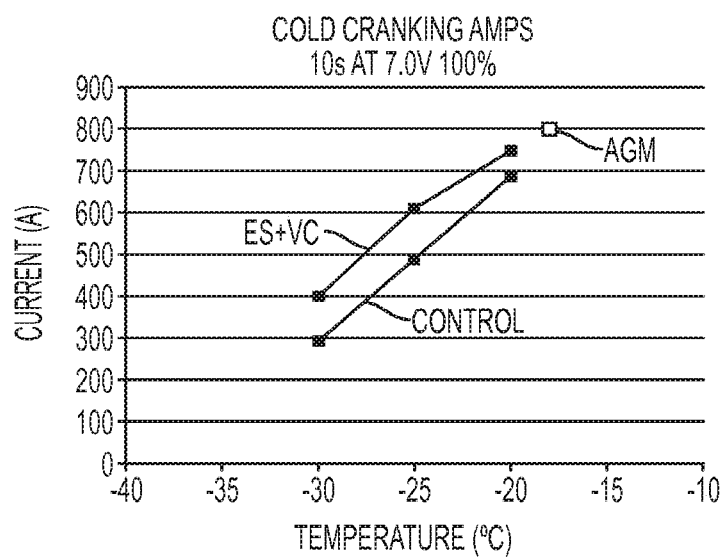

The results for cold cranking for 10 seconds at 7V are shown in FIG. 4A (for 60 Ah cells) and 4B (for 80 Ah batteries). The difference in performance reflects the improvements achieved using the modified electrolyte as described herein.

As seen from these plots, the cells with the modified electrolyte composition show 20-30% increase of current that can be drawn over control cells (between −20 and −15° C.), and the same cold crank properties as the lead acid batteries (at −17° C.).

Example 5: High Temperature Storage

Figure 5A:
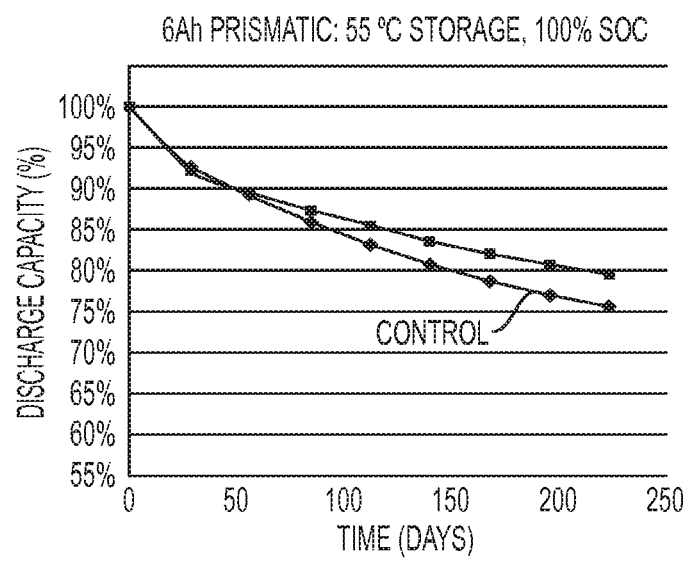
FIGS. 5A-5B are two plots comparing the capacity loss for two 6 Ah (FIG. 5A) and 20 Ah (FIG. 5B) capacity batteries at 55° C.: a control lithium metal phosphate battery and a lithium metal phosphate battery with a modified electrolyte composition, according to one or more embodiments.
Figure 5B:
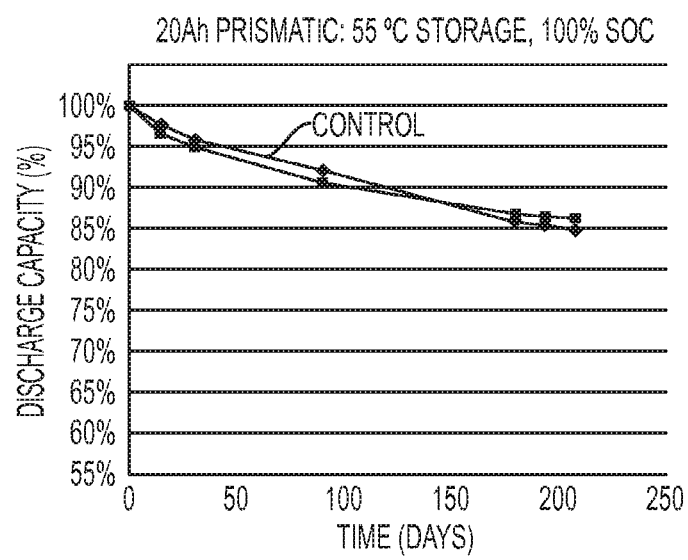
Figure 6A:
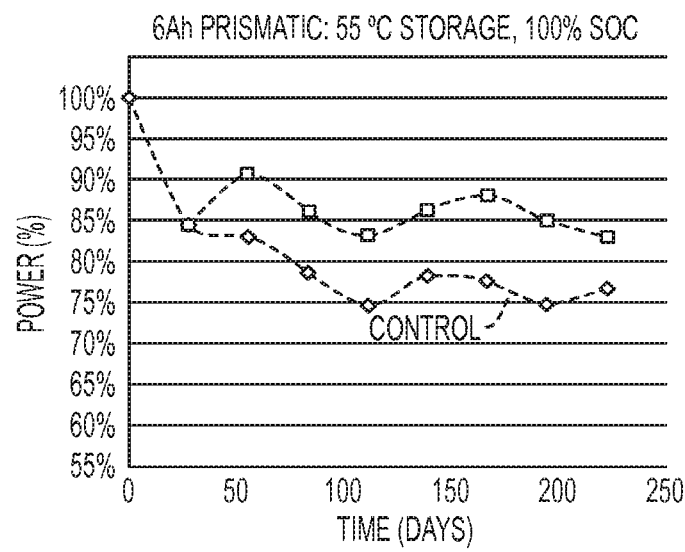
FIGS. 6A-6B are two plots comparing the power loss for two 6 Ah (FIG. 6A) and 20 Ah (FIG. 6B) capacity batteries at 55° C.: a control lithium metal phosphate battery and a lithium metal phosphate battery with a modified electrolyte composition, according to one or more embodiments.
Figure 6B:
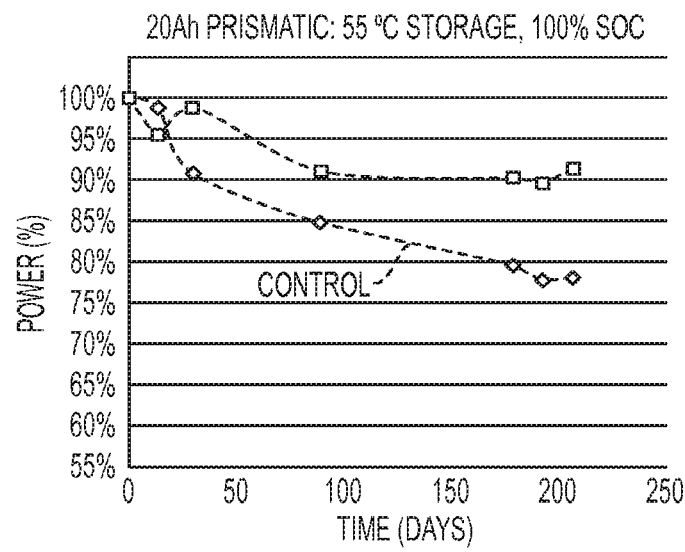
Figure 7A:
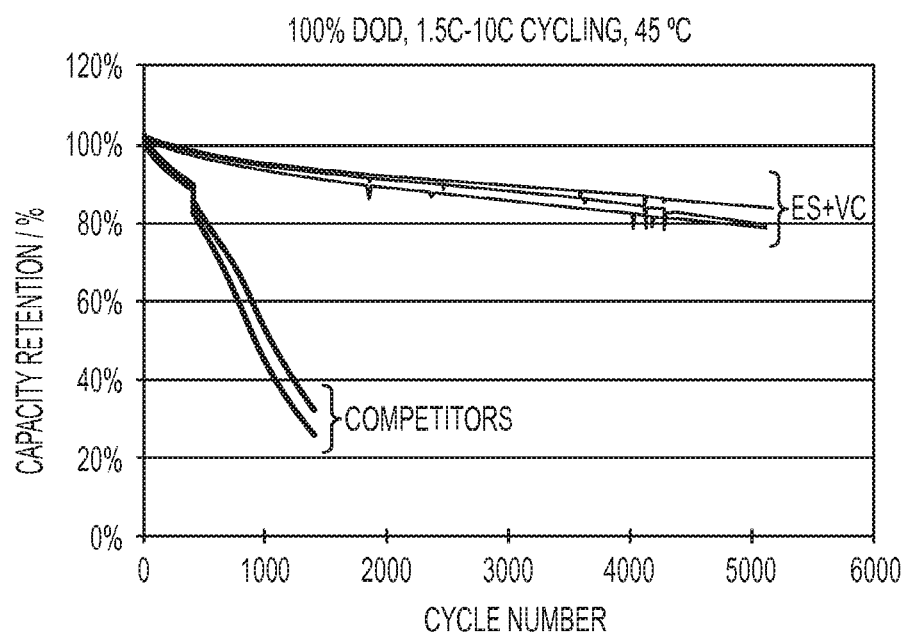
FIGS. 7A-7B are two plots comparing the capacity loss at 45° C. for 5000 (FIG. 7A) and 1800 (FIG. 7B) cycles of a lithium metal phosphate battery with a modified electrolyte composition and leading competitor batteries.
Figure 7B:
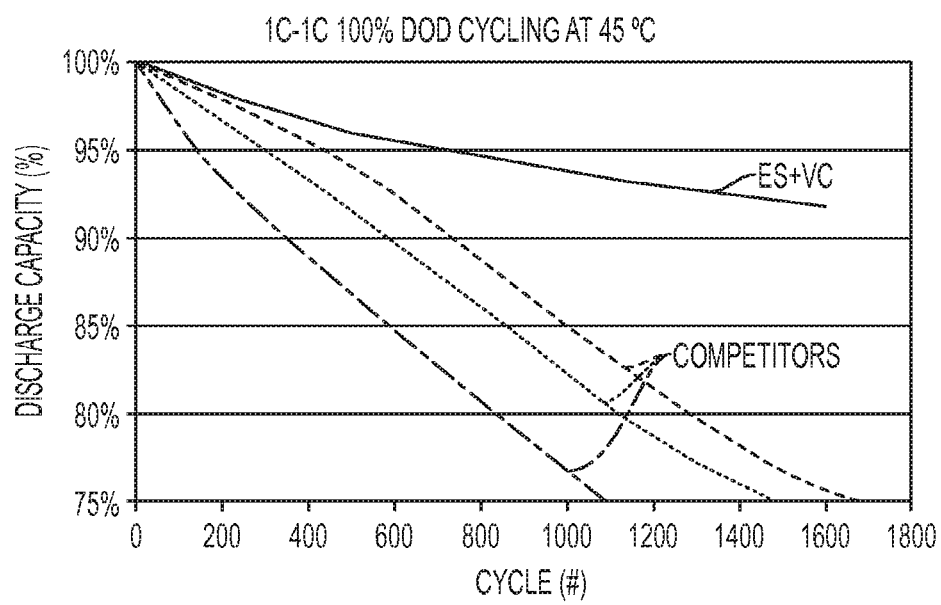
Figure 8A:
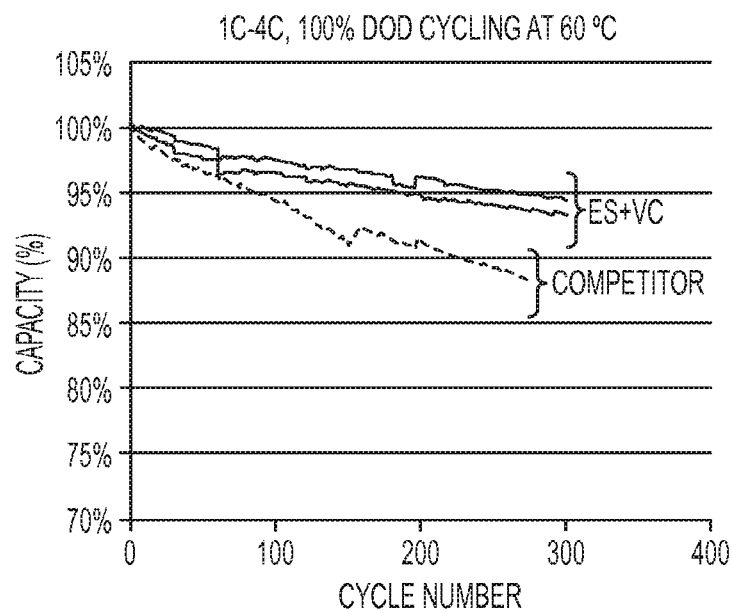
FIGS. 8A-8B are two plots comparing the capacity loss at 60° C.
Figure 8B:
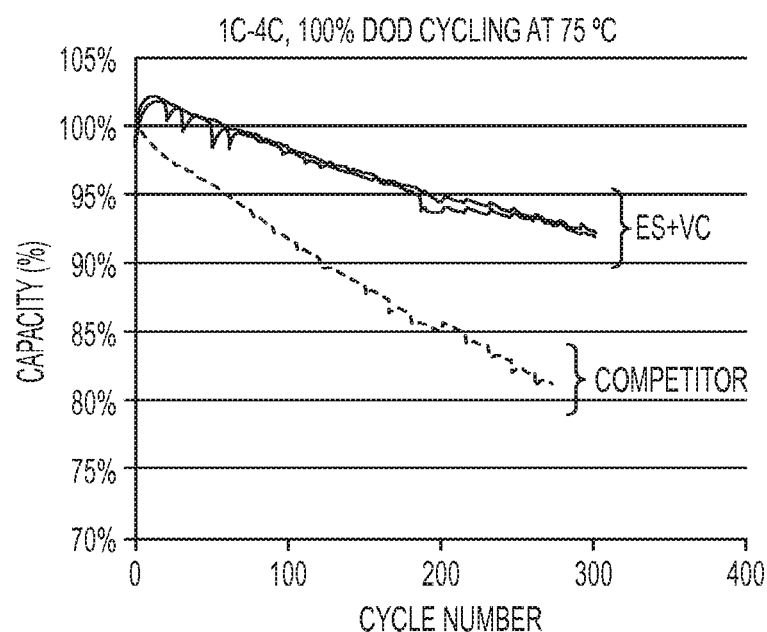

The disclosed modified electrolyte cells (ES+VC of Example 3) also displayed improved high temperature storage capabilities as compared to control cells. As shown in FIGS. 5A and 5B, the modified electrolyte cells had reduced capacity loss after high temperature storage (55° C.) as compared to control cells. In addition, as shown in FIGS. 6A and 6B, the modified electrolyte cells lost less power after high temperature storage (55° C.) than the control.

Example 6: High Temperature Cycling

The modified electrolyte cells (ES+VC of Example 3) also displayed improved performance during high temperature cycling over other leading microhybrid lithium ion competitors, as shown in FIGS. 7A and 7B and FIGS. 8A and 8B at various temperatures (45-75° C.), cycle rates (1C-10C) and cycle numbers (300-5000).

Figure 9:
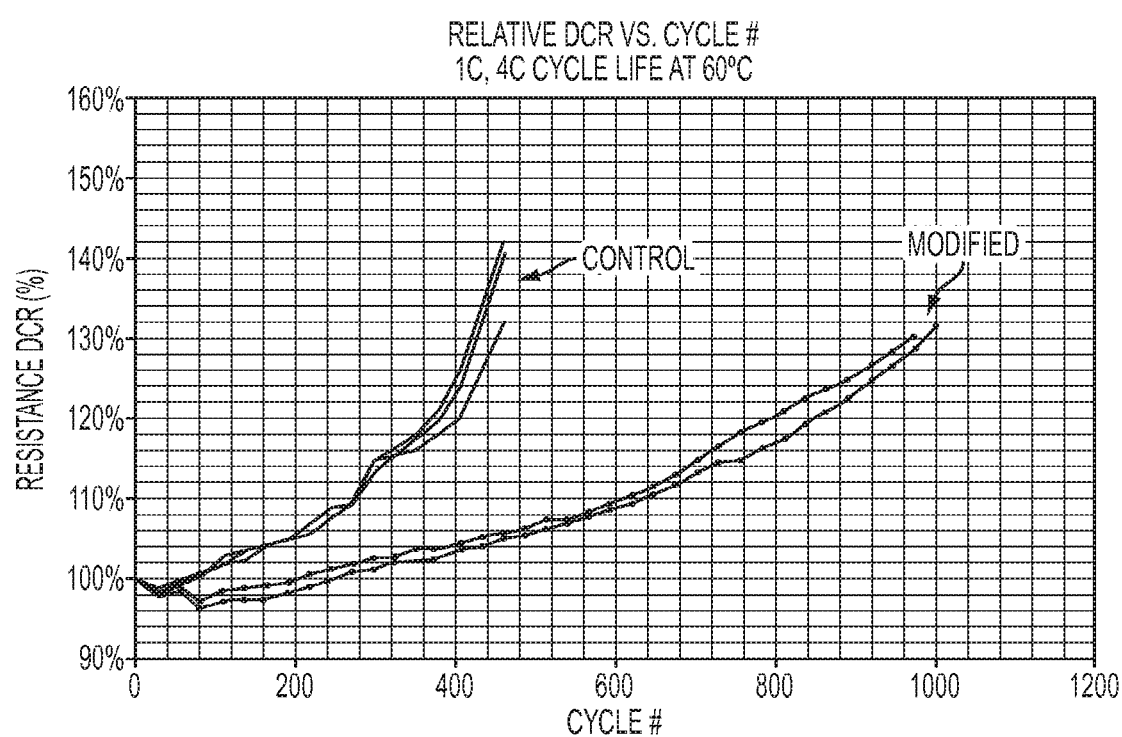
FIG. 9 is a plot of relative DC resistance changes versus cycle numbers for two PHEV 20 Ah cells: a control lithium metal phosphate battery and a lithium metal phosphate battery with a modified electrolyte composition, according to one or more embodiments.

Additionally, the modified electrolyte cells (ES+VC of Example 3) had lower impedance growth as compared to the "control" batteries at 60° C., as shown in FIG. 9.

Applications

Given the improved low-temperature characteristics and long-term stability of the modified electrolyte cells as disclosed herein, a number of different applications are contemplated.

The voltage characteristics of the present cells make them particularly well suited to 12-volt battery replacements. This is particularly true with lithium metal phosphate (preferably lithium iron phosphate) cells where 4 cells achieve about 12 volts.

In telecommunications, the modified electrolyte secondary cells can replace lead acid batteries (that are used during power outages to maintain service in cell towers), which tend to degrade quickly at high temperature.

In transportation, with increased fuel economy needs, more electrical loads are put on the battery rather than the engine. This is especially true in micro-hybrid cars, trucks and buses that use "stop-and-start" technology, shutting off the engine when the driver slows the vehicle down or stops it. The modified electrolyte cell can enhance engine start with improved cold crank performance, while extending life at high temperature storage, more than twice the life of lead acid batteries in micro-hybrid applications. The extended temperature performance also lowers weight and cost of the battery by reducing or eliminating heat management circuitry that is typically used in extreme temperature conditions.

The reduced cost and weight of the battery is also useful for defense applications which require wide operating temperatures, for ground vehicles, space and satellite applications, aircrafts, and man-portable personal devices.

The foregoing discussion should be understood as illustrative and should not be considered to be limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or step plus function elements in the claims below are intended to include any structure, material, or acts for performing the functions in combination with other claimed elements as specifically claimed.

The invention claimed is:

1. A rechargeable battery, comprising:
    a carbon-containing negative electrode capable of intercalating and liberating lithium,
    a positive electrode comprising a lithium transition metal oxoanion electroactive material,
    a separator, and
    a nonaqueous electrolyte solution free of γ-butyrolactone, the nonaqueous electrolyte solution comprising a lithium salt and a mixture of ethylene carbonate, propylene carbonate, ethylmethyl carbonate, diethyl carbonate, vinylene carbonate, and sulfolene,
    wherein the vinylene carbonate is present at 0.2 to 8 vol % of the nonaqueous electrolyte solution, and
    wherein the sulfolene is present at 0.1 to 3 weight % of the nonaqueous electrolyte solution.

2. The rechargeable battery of claim 1, wherein the nonaqueous electrolyte solution contains 1 to 3 weight % sulfolene.

3. The rechargeable battery of claim 1, wherein the nonaqueous electrolyte solution contains 1 to 1.5 weight % sulfolene.

4. The rechargeable battery of claim 1, wherein the nonaqueous electrolyte solution contains 0.5 to 3 vol % vinylene carbonate.

5. The rechargeable battery of claim 1, wherein the nonaqueous electrolyte solution contains 0.5 to 2 vol % vinylene carbonate.

6. The rechargeable battery of claim 1, wherein the carbon-containing negative electrode comprises non-graphitizable carbon, artificial graphite, or natural graphite combinations of carbonaceous materials with silicon or silicon oxide.

7. The rechargeable battery of claim 1, wherein a molar concentration of the lithium salt is between 0.5 and 2.0 mol/l.

8. The rechargeable battery of claim 1, wherein the lithium salt is selected from the group consisting of $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$ and $LiC(CF_3SO_2)_3$.

9. The rechargeable battery of claim 1, wherein the nonaqueous electrolyte solution further comprises aprotic solvents.

10. The rechargeable battery of claim 9, wherein the at least one organic solvent further comprises at least one of butylene carbonate, dimethyl carbonate, y-valerolactone, methyl acetate, methyl propionate, tetrahydrofuran, 2-methyl tetrahydrofuran, tetrahydropyran, dimethoxyethane, dimethoxymethane, ethylene methyl phosphate, ethyl ethylene phosphate, trimethyl phosphate, triethyl phosphate, a halide of any preceding organic solvent, vinyl ethylene carbonate and fluoroethylenecarbonate, poly(ethylene glycol) diacrylate, and combinations thereof.

11. The rechargeable battery of claim 1, where the rechargeable battery is contained within a pouch.

\* \* \* \* \*